(12) United States Patent
Bansal et al.

(10) Patent No.: US 11,644,999 B2
(45) Date of Patent: May 9, 2023

(54) PROTECTING MEMORY REGIONS BASED ON OCCURRENCE OF AN EVENT

(71) Applicant: QUALCOMM INCORPORATED, San Diego, CA (US)

(72) Inventors: Aneesh Bansal, Hyderabad (IN); Priyanka Dosi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/472,432

(22) Filed: Sep. 10, 2021

(65) Prior Publication Data
US 2023/0079183 A1    Mar. 16, 2023

(51) Int. Cl.
*G06F 3/06* (2006.01)
*G06F 11/14* (2006.01)
*G06F 11/07* (2006.01)

(52) U.S. Cl.
CPC .......... *G06F 3/0652* (2013.01); *G06F 3/0619* (2013.01); *G06F 3/0659* (2013.01); *G06F 3/0679* (2013.01); *G06F 11/0778* (2013.01); *G06F 11/1417* (2013.01)

(58) Field of Classification Search
CPC .... G06F 3/0619; G06F 3/0652; G06F 3/0659; G06F 3/0679; G06F 11/0778; G06F 11/1417
See application file for complete search history.

(56) References Cited

U.S. PATENT DOCUMENTS

| | | | |
|---|---|---|---|
| 2006/0041739 A1* | 2/2006 | Iwakura | G06F 11/0778 714/E11.138 |
| 2010/0138613 A1* | 6/2010 | Parker | G06F 12/0862 711/E12.001 |
| 2013/0111264 A1* | 5/2013 | Settsu | G06F 11/165 714/11 |
| 2021/0019264 A1* | 1/2021 | Patel | G06F 12/1408 |

* cited by examiner

*Primary Examiner* — Larry T MacKall
(74) *Attorney, Agent, or Firm* — Smith Tempel Blaha LLC/Qualcomm (57) ABSTRACT

Memory regions may be protected based on occurrence of an event in a computing device. Subsystems of the computing device may store information in a memory controller identifying memory regions to be erased upon occurrence of an event, such as a system or subsystem crash. The memory controller may control erasing the memory regions in response to an indication associated with the event. A memory dump may be performed after the memory regions have been erased.

15 Claims, 6 Drawing Sheets

PROTECTING MEMORY REGIONS BASED ON OCCURRENCE OF AN EVENT

DESCRIPTION OF THE RELATED ART

A computing device may include multiple subsystems that communicate with one another via buses or other interconnects. Such a computing device may be, for example, a portable computing device ("PCD"), such as a laptop or palmtop computer, a cellular telephone or smartphone, portable digital assistant, portable game console, etc. Still other types of PCDs may be used in automotive and Internet-of-Things ("IoT") applications. The communicating subsystems may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as a transceiver or "modem" subsystem that provides wireless connectivity, a memory subsystem, etc. The various processors may store data in a system memory under control of the memory subsystem.

Debugging and otherwise improving software commonly involves collecting a copy or snapshot of the content of a memory at the time of an event, such as an unanticipated failure of a system or subsystem, commonly referred to as a "crash." The snapshot may be referred to as a "memory dump." A memory dump collected at the time of a crash may be referred to as a "crash dump."

Traditionally, the scope of a crash dump covered the entire system memory. As a system memory may be very large, a traditional crash dump collection may take a substantial amount of time. More recently, crash dumps have been collected from PCDs over wireless networks. Such a remote crash dump collection may raise not only performance considerations but also security considerations. For these reasons, improvements in memory dump collection may be desirable.

SUMMARY OF THE DISCLOSURE

Systems, methods, computer-readable media, and other examples are disclosed for protecting memory regions based on occurrence of an event in a computing device.

An exemplary method for protecting memory regions based on occurrence of an event in a computing device may include a subsystem of the computing device storing information in a memory controller. The information may identify one or more memory regions to be erased upon occurrence of an event. The exemplary method may further include the memory controller erasing the one or more memory regions in response to an indication the memory controller receives.

An exemplary system for protecting memory regions based on occurrence of an event in a computing device may include a memory and a memory controller. The memory controller may include memory erase logic. The memory erase logic may be configured to store information identifying one or more memory regions to be erased upon occurrence of an event. The memory erase logic may further be configured to erase the one or more memory regions in response to an indication the memory controller receives.

Another exemplary system for protecting memory regions based on occurrence of an event in a computing device may include means for storing information in a memory controller that identifies one or more memory regions to be erased upon occurrence of an event. The exemplary system may further include means for erasing the one or more memory regions in response to an indication.

An exemplary computer-readable medium for protecting memory regions based on occurrence of an event in a computing device may comprise a non-transitory computer-readable medium having instructions stored thereon in computer-executable form. The instructions, when executed by a processing system, may configure the processing system to store, under control of a subsystem of the computing device, information in a memory controller that identifies one or more memory regions to be erased upon occurrence of an event. The instructions may further configure the processing system to erase, under control of the memory controller, the one or more memory regions in response to an indication received by the memory controller.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
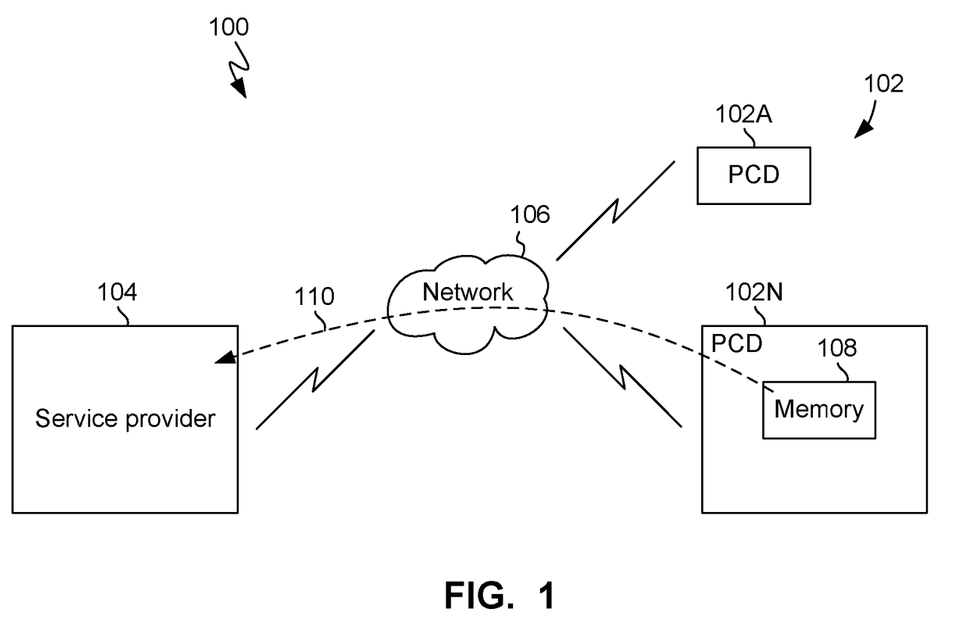
FIG. 1 is a block diagram illustrating a system for collecting a memory dump from a computing device, in accordance with exemplary embodiments.

As shown in FIG. 1, in an illustrative or exemplary embodiment a system 100 may include any number of portable computing devices ("PCD"s) 102, such as PCDs 102A through 102N, configured to communicate with a service provider 104 via one or more wireless networks 106.

A PCD 102 may be, for example, a cellular telephone such as a smartphone, or it may be a satellite telephone, a laptop or palmtop computer, a tablet, a navigation device, a smartbook, a personal digital assistant ("PDA"), an Internet-of-Things ("IoT") device, an automotive computing device, etc. The PCD 102 may include, among other elements (not shown for purposes of clarity), one or more memories 108. The service provider 104 may be, for example, a manufacturer of the PCD 102 or a subsystem or other component of the PCD 102. The service provider 104 may participate in services that may include debugging or otherwise improving software operating on the PCD 102. Accordingly, the service provider 104 may desire to upload or collect a memory dump from the memory 108 via the one or more wireless networks 106, as conceptually indicated by the broken-line arrow 110. Although in this exemplary embodiment (FIG. 1) the memory dump is collected via the one or more wireless networks 106, in other embodiments such a memory dump may be collected via any other type of connection, such as a wired connection (e.g., via a USB cable, a JTAG interface, etc.). The term "memory dump" or "memory dump collection" as used herein broadly refers to collecting memory contents and should not be construed as limited to any particular event, reason, time, amount of data collected, etc.

Some regions of the memory 108 may contain sensitive data. Examples of sensitive data include data used to maintain security, data that is private to a user of the PCD 102, data that embodies confidential information (e.g., trade secrets or other intellectual property) of a manufacturer of the PCD 102 or a related entity, etc. For security and privacy reasons, it may be desirable to prevent sensitive data from being uploaded via the networks 106 or other connection in a memory dump collection. Alternatively, or in addition, it may be desirable to prevent sensitive data from being accessed by unauthorized software entities in the event the system is rebooted (for any reason, including but not limited to a system crash). One solution is for a trusted software entity to maintain a database of regions of the memory 108 that contain sensitive yet unencrypted data, and then to erase those regions prior to the memory dump collection. A disadvantage of this solution is that the erasing operation adds performance overhead. Another disadvantage is that if the database is stored in the memory 108, a system crash may render reading the database unreliable. There may also be security issues if the database can become compromised. The following solution may avoid some or all of these disadvantages.

Figure 2:
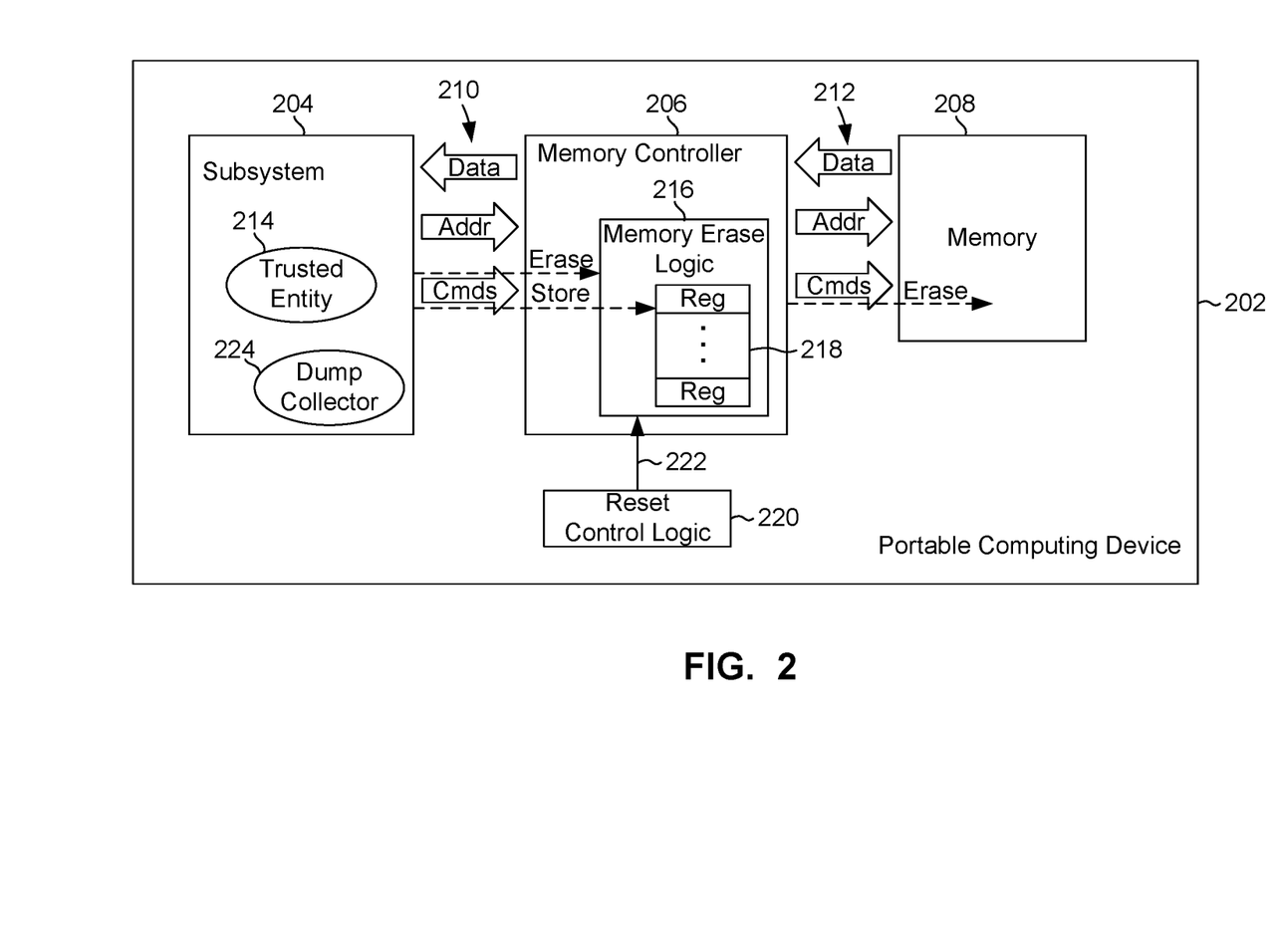
FIG. 2 is a block diagram illustrating aspects of a computing device having a system for protecting memory regions based on occurrence of an event, in accordance with exemplary embodiments.

As illustrated in FIG. 2, an exemplary PCD 202 may include a subsystem 204, a memory controller 206 and a memory 208. The subsystem 204 may be an exemplary one of any number of PCD subsystems, others of which are not shown in FIG. 2 for purposes of clarity. The subsystem 204 may be coupled with the memory controller 206 via one or more buses or other system interconnects 210. The memory controller 206 may be coupled with the memory 208 via one or more other buses or system interconnects 212. In addition to the manner of operation described below with regard to protecting memory regions collected in a memory dump, the subsystem 204, memory controller 206 and memory 208 may operate in a manner well understood by one of ordinary skill in the art. For example, in response to memory transaction requests (e.g., write requests, read requests, etc.) from the subsystem 204, the memory controller 206 may store (i.e., write) data in and retrieve (i.e., read) data from locations in the memory 208. As understood by one of ordinary skill in the art, in a memory transaction request the subsystem 204 may provide one or more commands indicating whether the request is to write data or read data and may also provide one or more addresses indicating locations in the memory 208. Note that the "Data," "Address" and "Commands" arrows in FIG. 2 indicate the direction in which data, address and commands relating to protecting memory regions collected in a memory dump are communicated, and that data may also be communicated in the opposite direction of the "Data" arrows when data is to be written to the memory 208.

The memory 208 may be a dynamic random access memory ("DRAM") such as, for example, a double data-rate synchronous DRAM ("DDR-SDRAM" or, for brevity, "DDR"). In addition to the configuration described below, the memory controller 206 may be configured to complete memory transactions in response to memory transaction requests and to perform other conventional DDR operations, such as refresh, etc., as understood by one of ordinary skill in the art.

The subsystem 204 may operate under the control of software in the manner of a processor or similar device. Such software may include trusted entity ("TE") software that may configure portion of the subsystem 204 as a TE 214. An example of the subsystem 204 is a central processing unit ("CPU"), which may also be referred to as an application processor ("AP").

The memory controller 206 may include memory erase logic 216. The memory erase logic 216 may include any number of registers 218 or other hardware-based storage structures configured to store information indicating addresses or locations in the memory 208.

The subsystem 204 (or the trusted entity 214) may issue requests to the memory controller 206 to store information in the registers 218 indicating or identifying addresses or regions in the memory 208 to be erased by the memory erase logic 216 upon occurrence of a predetermined event or condition, such as, for example, a predetermined command, signal, etc. These requests or indications may be in the form of commands. In response to such a "store command" or request received from the subsystem 204, the memory erase logic 216 may be configured to store the information identifying a region of the memory 208. For example, the information may identify a starting address and size of a region, and the memory erase logic 216 may store the starting address and size in one of the registers 218. In such an example, each register 218 may represent one region of a fixed size to be erased upon occurrence of the predetermined event or condition. Each time the memory controller 206 receives a request of the above-described type to store information in the registers 218, the memory erase logic 216 may store the information in the next available register 218. That is, the registers 218 may be organized in a list, and the memory erase logic 216 may maintain a pointer to the register 218 at the next location in the list after the last location in which information was stored. Nevertheless, alternative schemes for selecting from among the registers 218 or other storage structures and storing the information therein will occur readily to one of ordinary skill in the art in view of these teachings and examples.

The subsystem 204 (or the trusted entity 214) may also issue requests or other indications to the memory controller 206 to erase the one or more memory regions identified by the information that has been stored in the registers 218. These erase requests or indications may be in the form of commands. For example, the memory controller 206, and in particular the memory erase logic 216, may be configured to respond to an erase command. In such an example, the memory erase logic 216 may be configured to erase those one or more memory regions in response to an erase command received by the memory controller 206 from the subsystem 204. The memory erase logic 216 may be configured to erase those one or more memory regions by sending erase commands or other commands to the memory 208. The term "erase" means to render the memory contents unreadable. Accordingly, the commands sent to the memory 208 may include commands to obscure any physical manifestations of the data that had been stored in those memory regions, an effect sometimes referred to as wiping or scribbling. For example, the commands may include commands to over-write the memory regions with one or more data patterns. The data pattern or patterns may include all "1" s, all "0" s, alternating "1"s and "0" s, random data, etc., as understood by one of ordinary skill in the art. Alternatively, or in addition, such commands could include commands that selectively power down memory cells for a duration that ensures the memory contents are lost. Still other ways of erasing the memory regions using commands will occur readily to one of ordinary skill in the art in view of these teachings and examples. After erasing the memory regions, the memory erase logic 216 may make all the registers 218 again available for storing information.

The memory erase logic 216 may also be coupled to reset control logic 220. The reset control logic 220 may be configured to assert one or more reset signals in response to occurrence of certain events, such as, for example, when the PCD 202 is booted, or when the PCD 202 experiences a system crash, etc. The reset control logic 220 may include logic (not shown) to detect such a system crash or boot and, in response, generate a system reset signal. As the manner in which such logic may detect a system crash, system boot, etc., and the manner in which such logic may generate a system reset signal are well understood by one of ordinary skill in the art, the reset control logic 220 is not described in further detail herein. Nevertheless, it should be noted that one such reset signal 222 may be coupled to the memory erase logic 216. Alternatively to, or in addition to, being configured to respond to an erase command in the manner described above, the memory erase logic 216 may be configured to respond to the reset signal 222. In such an example, the memory erase logic 216 may be configured to erase the one or more memory regions identified by the information that has been stored in the registers 218 in response to assertion of the reset signal 222 by the reset control logic 220. Alternatively, or in addition, the memory erase logic 216 may be configured to receive a signal (not shown) from the subsystem 204 or some other subsystem or component and may be configured to erase the one or more memory regions in response to assertion of that signal.

Figure 3:
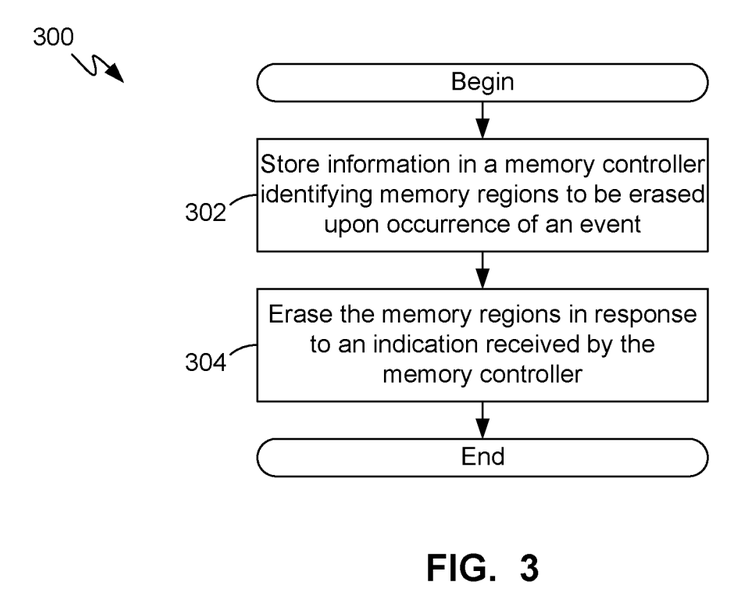
FIG. 3 is a flow diagram illustrating a method for protecting memory regions based on occurrence of an event in a computing device, in accordance with exemplary embodiments.

As illustrated in FIG. 3, an exemplary method 300 for protecting memory regions based on occurrence of an event in a computing device may include the following. As indicated by block 302, the method 300 may include storing information in a memory controller identifying one or more regions of a memory. As indicated by block 304, the method 300 may include erasing the one or more memory regions in response to an indication received by the memory controller. As described above with regard to FIG. 2, such an erase indication may be, for example, an erase command received from a subsystem. Alternatively or in addition, such an erase indication may be, for example, a system reset signal received from reset control logic or other signal. The above-described memory erase logic 216 (FIG. 2) may serve as an exemplary means for performing the functions associated with blocks 302 and 304.

Figure 4:
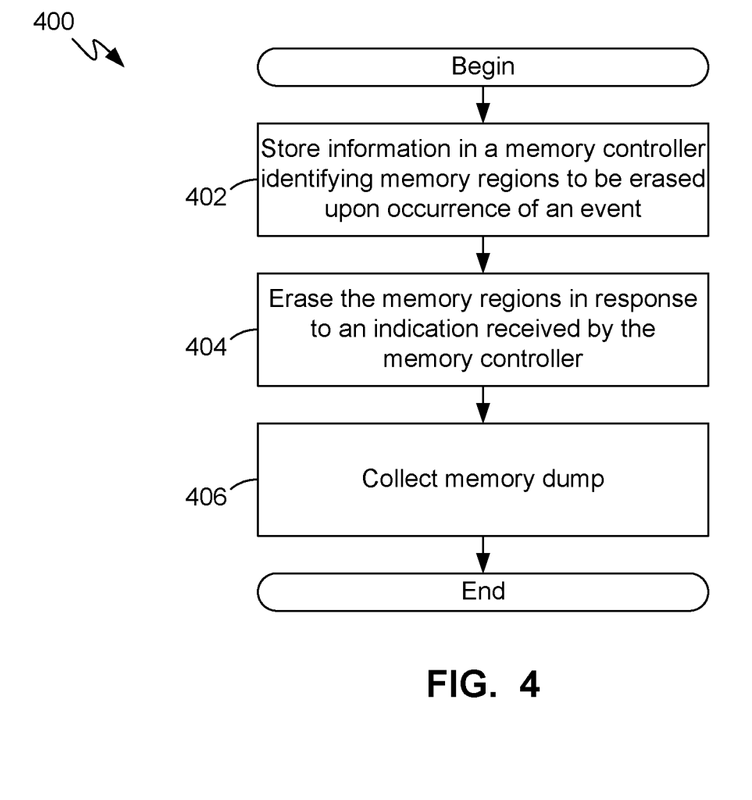
FIG. 4 is a flow diagram illustrating another method for protecting memory regions based on occurrence of an event in a computing device, in accordance with exemplary embodiments.

As illustrated in FIG. 4, another exemplary method 400 for protecting memory regions based on occurrence of an event in a computing device may include the following. As indicated by block 402, the method 400 may include storing information in a memory controller identifying one or more regions of a memory. As indicated by block 404, the method 400 may include erasing the one or more memory regions in response to an indication received by the memory controller. As indicated by block 406, the method 400 may further include performing or controlling a memory dump collection. For example, after the memory regions have been erased in the manner described above, the contents of the memory 208 or one or more portions thereof may be transmitted to a remote entity. The memory contents, i.e., a memory dump, may be transmitted via, for example, a wireless network or other connection as described above with regard to FIG. 1.

Referring briefly again to FIG. 2, the software under which the subsystem 204 operates may include memory dump collection software. A portion of the subsystem 204, configured by such software as a memory dump collector 224, may serve as a means for collecting (including transmitting) the memory dump from the memory 208. The memory dump collection software may be, for example, a portion of a high-level operating system in an example in which the subsystem 204 is a CPU or AP executing the high-level operating system.

Figure 5:
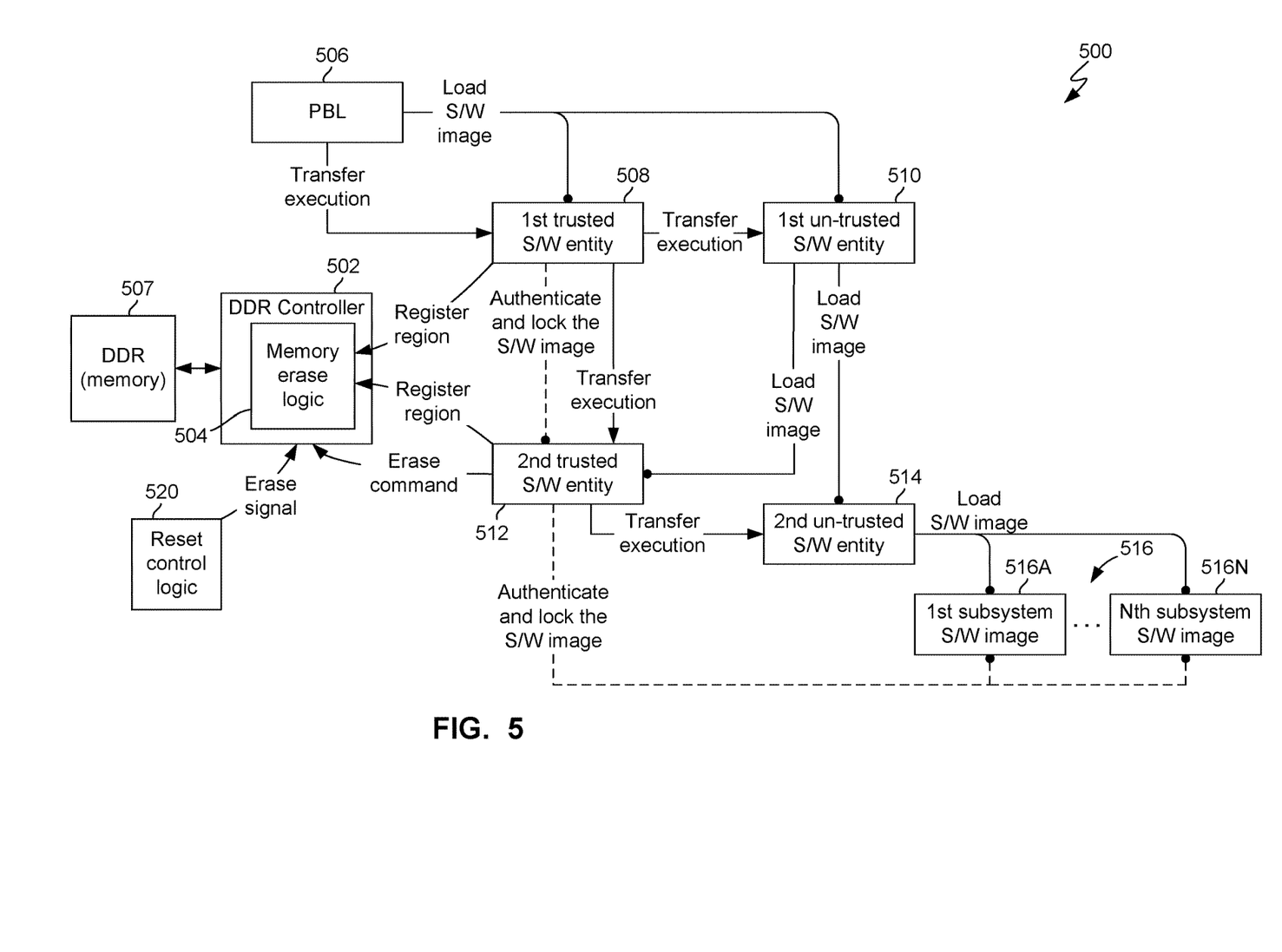
FIG. 5 is an operational flow diagram illustrating software flow aspects of a system for protecting memory regions based on occurrence of an event in a computing device, in accordance with exemplary embodiments.

As illustrated in FIG. 5 in operational flow diagram form, an exemplary system 500 may include a memory (e.g., DDR) controller 502 having memory erase logic 504. The memory controller 502 and memory ease logic 504 may be similar to the memory controller 206 and memory erase logic 216 described above with regard to FIG. 2. The system 500 may also include various software or firmware elements, such as a primary boot loader ("PBL") 506. These software or firmware elements may be executed by a processor, such as a CPU or AP (not shown). The PBL 506 may be executed from a read-only memory (not shown) as part of the process of booting a computing device, such as a PCD. The PBL 506 may control loading (into allocated regions of DDR 507 or other memory) and authentication of a first trusted software entity 508 and a first un-trusted software entity 510. Although not shown for purposes of clarity, the first trusted software entity 508 may be executed in a trusted or secure portion of a processor. Also note that for purposes of clarity in FIG. 5 the various software elements that may be loaded in the DDR 507 are conceptually depicted externally to the DDR 507.

After loading and authenticating the first trusted software entity 508 and first un-trusted software entity 510, the PBL 506 may transfer execution to the first trusted software entity 508 to continue the boot process. The first trusted software entity 508 may then lock the one or more memory regions allocated to it against access by any other entities. Then, the first trusted software entity 508 may register those one or more memory regions in the memory erase logic 504. That is, the first trusted software entity 508 may store information identifying the memory regions in the manner described above with regard to the trusted entity 214 in FIG. 2.

In the illustrated embodiment, a task of the first un-trusted software entity 510 may be to load further software entities in the DDR 507. For example, the first un-trusted software entity 510 may control loading and authentication of a second trusted software entity 512 and a second un-trusted software entity 514. Like the first trusted software entity 508, the second trusted software entity 512 may be executed in the trusted or secure portion of the processor (not shown).

The second trusted software entity 512 may then lock the one or more memory regions allocated to it against access by any other entities. Then, the second trusted software entity 512 may register those one or more memory regions in the memory erase logic 504. That is, the second trusted software entity 512 may store information identifying the memory regions in the manner described above with regard to the trusted entity 214 in FIG. 2. Note that the first trusted software entity 508 and the second trusted software entity 512 may comprise sensitive information that would be desirable to erase before a memory dump collection or system reboot is performed. With regard to erasing memory regions before a system reboot, it may be desirable to prevent the first un-trusted software entity 510 or other un-trusted software entities from accessing sensitive information that may have been saved in a memory region at run time before the reboot.

The second un-trusted software entity 514 may be, for example, a high-level operating system or portion thereof. The second trusted software entity 512 may transfer execution to the second un-trusted software entity 514 (e.g., HLOS) to continue the boot process.

The second un-trusted software entity 514 (e.g., HLOS) may then allocate and load into the DDR 507 any number of subsystem software images 516, such as a first subsystem software image 516A through an Nth subsystem software image 516N. Some or all of the subsystem software images 516 may comprise sensitive information that would be desirable to erase before a memory dump collection is performed. The second trusted software entity 512 may then lock and authenticate any memory regions containing subsystem software images 516 comprising sensitive information against access by any other entities. Then, the second trusted software entity 512 may register any such memory regions in the memory erase logic 504.

After booting is complete, various subsystems of the computing device may begin operating, under control of their associated software images 516. Before a memory dump collection is performed, and/or before memory regions are opened for access by untrusted software entities during a system reboot, it also may be desirable to erase any sensitive data that may be stored in memory under control of a subsystem in operation (i.e., in dynamically allocated memory regions). Accordingly, the second trusted software entity 512 may register any such memory regions in the memory erase logic 504.

In the event of a system crash, reset control logic 520 may signal the memory erase logic 504 in the manner described above with regard to the reset control logic 220 (FIG. 2). In response to such a system crash or system reset event, the memory erase logic 504 may control erasing of the one or more registered memory regions in preparation for a memory dump collection. The first trusted software entity 508 may unlock memory regions that it has locked, making them available for memory dump collection. The first un-trusted software entity 510 may then perform the memory dump collection from the memory regions that had been erased as described above as well as any other memory regions. For example, the first un-trusted software entity 510 may collect the data from the entire system memory (i.e., all allocated memory regions). The first un-trusted software entity 510 may also initiate sending the memory dump (i.e., the collected data) to a remote destination, as described above with regard to FIG. 1. Alternatively, the first un-trusted software entity 510 may collect the memory dump and store it as a file (e.g., in flash memory, an SD card, a UFS device, etc.). The file can later be downloaded from the device or uploaded over a network.

In an alternative scenario or use case, instead of the one or more registered memory regions being erased in response to a system crash or system reset event, the one or more registered memory regions may be erased in response to a subsystem crash or subsystem reset event. For example, the second un-trusted software entity 514 (HLOS) may detect that one of the subsystems 516 has crashed. In preparation for a memory dump collection, the second un-trusted software entity 514 (HLOS) may then send a request to the second trusted software entity 512, requesting that the one or more registered memory regions be erased. In response to such a request, the second trusted software entity 512 may send an erase command to the memory erase logic 504. In response to the erase command, the memory erase logic 504 may control erasing the one or more registered memory regions. The second trusted software entity 512 may unlock memory regions associated with the crashed subsystem, making them available for memory dump collection. Then, the second un-trusted software entity 514 may perform the memory dump collection from memory regions associated with the crashed subsystem 516. The second un-trusted software entity 514 (HLOS) may also initiate sending the memory dump (i.e., the collected data) to a remote destination.

Figure 6:
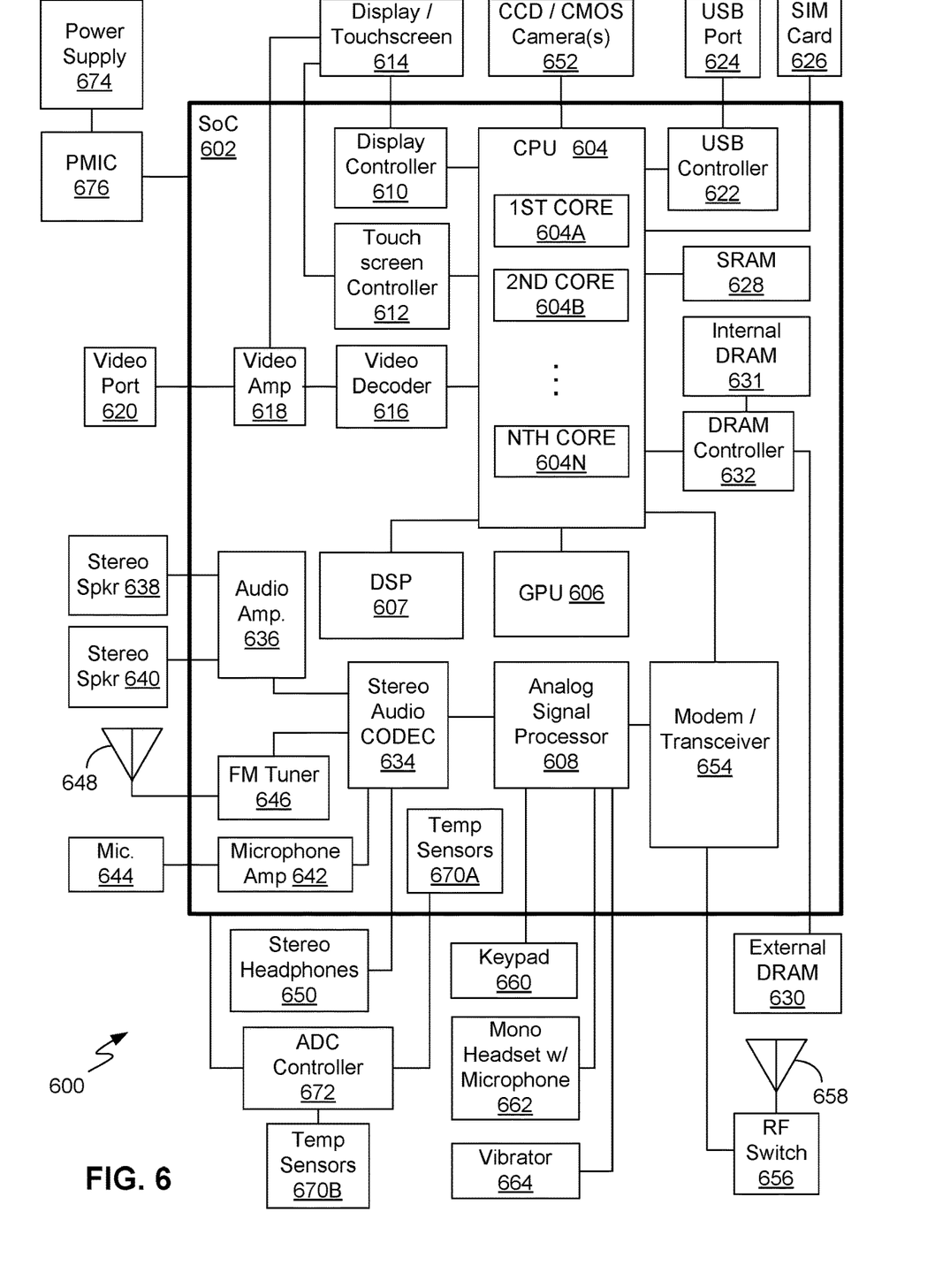
FIG. 6 is block diagram of a portable computing device, in accordance with exemplary embodiments.

In FIG. 6, an example of a PCD 600 in which exemplary embodiments of systems, methods, computer-readable media, and other examples of protecting memory regions based on occurrence of an event may be provided is illustrated. For purposes of clarity, some data buses, clock signals, power supply voltages, etc., are not shown in FIG. 6.

The PCD 600 may include an SoC 602. The SoC 602 may include a CPU 604, an NPU 605, a GPU 606, a DSP 607, an analog signal processor 608, or other processors. The CPU 604 may include one or more CPU cores, such as a first CPU core 604A, a second CPU core 604B, etc., through an Nth CPU core 604N.

A display controller 610 and a touch-screen controller 612 may be coupled to the CPU 604. A touchscreen display 614 external to the SoC 602 may be coupled to the display controller 610 and the touch-screen controller 612. The PCD 600 may further include a video decoder 616 coupled to the CPU 604. A video amplifier 618 may be coupled to the video decoder 616 and the touchscreen display 614. A video port 620 may be coupled to the video amplifier 618. A universal serial bus ("USB") controller 622 may also be coupled to CPU 604, and a USB port 624 may be coupled to the USB controller 622. A subscriber identity module ("SIM") card 626 may also be coupled to the CPU 604.

One or more memories may be coupled to the CPU 604. The one or more memories may include both volatile and non-volatile memories. Examples of volatile memories include static random access memory ("SRAM") 628 and DRAM 630 and 631. Such memories may be external to the SoC 602, such as the DRAM 630, or internal to the SoC 602, such as the DRAM 631. A DRAM controller 632 coupled to the CPU 604 may control the writing of data to, and reading of data from, the DRAMs 630 and 631. The DRAM controller 632 may be an example of the above-described memory controllers 206 (FIG. 2) or 502 (FIG. 5). The DRAMs 630 and 631, SRAM 628 or other memories (not shown) of the PCD 600 may be an example of the above-described memory 208 (FIG. 2) or 507 (FIG. 5).

A stereo audio CODEC 634 may be coupled to the analog signal processor 608. Further, an audio amplifier 636 may be coupled to the stereo audio CODEC 634. First and second stereo speakers 638 and 640, respectively, may be coupled to the audio amplifier 636. In addition, a microphone amplifier 642 may be coupled to the stereo audio CODEC 634, and a microphone 644 may be coupled to the microphone amplifier 642. A frequency modulation ("FM") radio tuner 646 may be coupled to the stereo audio CODEC 634. An FM antenna 648 may be coupled to the FM radio tuner 646. Further, stereo headphones 650 may be coupled to the stereo audio CODEC 634. Other devices that may be coupled to the CPU 604 include one or more digital (e.g., CCD or CMOS) cameras 652.

A modem or RF transceiver 654 may be coupled to the analog signal processor 608 and the CPU 604. An RF switch 656 may be coupled to the RF transceiver 654 and an RF antenna 658. In addition, a keypad 660, a mono headset with a microphone 662, and a vibrator device 664 may be coupled to the analog signal processor 608.

The SoC 602 may have one or more internal or on-chip thermal sensors 670A and may be coupled to one or more external or off-chip thermal sensors 670B. An analog-to-digital converter ("ADC") controller 672 may convert voltage drops produced by the thermal sensors 670A and 670B to digital signals. A power supply 674 and a power management integrated circuit ("PMIC") 676 may supply power to the SoC 602.

The PCD 600 is only one example of a device or system in which exemplary embodiments of systems, methods, computer-readable media, and other embodiments of protecting memory regions based on occurrence of an event may be provided. Other examples may include other types of computing devices or computing systems, such as those used in datacenter, automotive, IoT and other contexts.

Firmware or software may be stored in any of the above-described memories, such as DRAM 630 or 631, SRAM 628, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Alternative embodiments will become apparent to one of ordinary skill in the art to which the invention pertains. Therefore, although selected aspects have been illustrated and described in detail, it will be understood that various substitutions and alterations may be made therein.

Implementation examples are described in the following numbered clauses:

1. A method for protecting memory regions based on occurrence of an event in a computing device, comprising:
   storing, by a subsystem of the computing device, information in a memory controller identifying one or more memory regions of a memory; and
   erasing, by the memory controller, the one or more memory regions in response to an indication received by the memory controller.

2. The method of clause 1, further comprising performing a memory dump collection from the memory after erasing the one or more memory regions.

3. The method of clauses 1-2, wherein storing the information by the subsystem comprises storing the information in memory controller hardware.

4. The method of clauses 1-3, further comprising the memory controller receiving the indication from reset control logic in response to a system reset event in the computing device.

5. The method of clauses 1-4, further comprising the memory controller receiving the indication from the subsystem, the indication comprising a command.

6. The method of clauses 1-5, wherein storing the information by the subsystem comprises storing the information by a trusted entity associated with the subsystem.

7. The method of clauses 1-6, wherein storing the information by the subsystem comprises storing the information during a system boot.

8. The method of clauses 1-7, wherein the computing device is a portable computing device ("PCD") comprising one of: a cellular telephone, a satellite telephone, a laptop computer, a tablet, a navigation device, a smartbook, a personal digital assistant ("PDA"), an Internet-of-Things ("IoT") device, and an automotive computing device.

9. A system for protecting memory regions based on occurrence of an event in a computing device, comprising:
   a memory; and
   a memory controller coupled to the memory, the memory controller including memory erase logic configured to:
   store, in response to a request by a subsystem of the computing device, information in the memory erase logic identifying one or more memory regions of the memory; and
   erase the one or more memory regions in response to an indication received by the memory controller.

10. The system of clause 9, further comprising a memory dump collector configured to collect a memory dump from the memory after the one or more memory regions are erased.

11. The system of clauses 9-10, wherein the memory erase logic includes registers configured to store the information.

12. The system of clauses 9-11, wherein the memory controller is configured to receive the indication from reset control logic in response to a system reset event in the computing device.

13. The system of clauses 9-12, wherein the memory controller is configured to receive the indication as a command from the subsystem.

14. The system of clauses 9-13, wherein a trusted entity associated with the subsystem is configured to initiate storing the information.

15. The system of clause 9-13, wherein the information is stored by the subsystem during a system boot.

16. The system of clauses 9-15, wherein the computing device is a portable computing device ("PCD") comprising one of: a cellular telephone, a satellite telephone, a laptop computer, a tablet, a navigation device, a smartbook, a personal digital assistant ("PDA"), an Internet-of-Things ("IoT") device, and an automotive computing device.

17. A system for protecting memory regions based on occurrence of an event in a computing device, comprising:
   means for storing information in a memory controller identifying one or more memory regions of a memory; and
   means for erasing the one or more memory regions in response to an indication received by the memory controller.

18. The system of clause 17, further comprising means for performing a memory dump collection from the memory after erasing the one or more memory regions.

19. The system of clauses 17-18, wherein the means for storing the information comprises means for storing the information in memory controller hardware.

20. The system of clauses 17-19, further comprising means for receiving the indication from reset control logic in response to a system reset event in the computing device.

21. The system of clauses 17-20, further comprising means for receiving the indication as a command from the subsystem.

22. The system of clauses 17-21, wherein the means for storing the information comprises a trusted entity associated with the subsystem.

23. The system of clauses 17-22, wherein the means for storing the information comprises means for storing the information during a system boot.

24. The system of clauses 17-23, wherein the computing device is a portable computing device ("PCD") comprising one of: a cellular telephone, a satellite telephone, a laptop computer, a tablet, a navigation device, a smartbook, a personal digital assistant ("PDA"), an Internet-of-Things ("IoT") device, and an automotive computing device.

25. A computer-readable medium for protecting memory regions based on occurrence of an event in a computing device, the computer-readable medium comprising a non-transitory computer-readable medium having instructions stored thereon in computer-executable form, the instructions when executed by a processing system configuring the processing system to:

store, under control of a subsystem of the computing device, information in a memory controller identifying one or more memory regions of a memory; and erase, under control of the memory controller, the one or more memory regions in response to an indication received by the memory controller.

26. The computer-readable medium of clause 25, wherein the instructions further configure the processing system to perform a memory dump collection from the memory after erasing the one or more memory regions.

27. The computer-readable medium of clauses 25-26, wherein the instructions configuring the processing system to store the information comprise instructions configuring the processing system to store the information in memory controller hardware.

28. The computer-readable medium of clauses 25-27, wherein the instructions configure the memory controller to receive the indication from reset control logic in response to a system reset event in the computing device.

29. The computer-readable medium of clauses 25-28, wherein the instructions configure the memory controller to receive the indication as a command from the subsystem.

30. The computer-readable medium of clauses 25-29, wherein the instructions configuring the processing system to store the information in the memory controller comprise instructions configuring a trusted entity associated with the subsystem to store the information in the memory controller.

31. The computer-readable medium of clauses 25-30, wherein the instructions configure the processing system to store the information in the memory controller during a system boot.

What is claimed is:

1. A method for protecting memory regions based on occurrence of an event in a computing device, comprising:

storing, by a subsystem of the computing device, location information in registers of memory erase logic of a memory controller identifying one or more memory regions of a memory, the location information in the registers of the memory erase logic comprising addresses for the one or more memory regions which contain sensitive information;

the memory erase logic of the memory controller receiving an indication from the subsystem, the indication comprising a reset command;

erasing, by the memory erase logic of the memory controller, the one or more memory regions corresponding to the location information comprising addresses for the memory which contain sensitive information in response to the indication received by the memory erase logic of the memory controller; and performing a memory dump collection from the memory after erasing the one or more memory regions.

2. The method of claim 1, further comprising the memory erase logic of the memory controller receiving the indication from reset control logic in response to a system reset event in the computing device.

3. The method of claim 1, wherein storing the location information by the subsystem comprises storing the location information by a trusted entity associated with the subsystem.

4. The method of claim 1, wherein storing the location information by the subsystem comprises storing the location information during a system boot.

5. The method of claim 1, wherein the computing device is a portable computing device ("PCD") comprising one of: a cellular telephone, a satellite telephone, a laptop computer, a tablet, a navigation device, a smartbook, a personal digital assistant ("PDA"), an Internet-of-Things ("IoT") device, and an automotive computing device.

6. A system for protecting memory regions based on occurrence of an event in a computing device, comprising:

a memory; and a memory controller coupled to the memory, the memory controller including memory erase logic configured to:

store, in response to a request by a subsystem of the computing device, location information in registers of the memory erase logic identifying one or more memory regions of the memory, the location information comprising addresses for the one or more memory regions which contain sensitive information;

receive an indication from the subsystem, the indication comprising a reset command;

erase the one or more memory regions corresponding to the location information comprising addresses for the memory which contain sensitive information in response to the indication received by the memory controller; and perform a memory dump collection from the memory after erasing the one or more memory regions.

7. The system of claim 6, further comprising a memory dump collector configured to collect a memory dump from the memory after the one or more memory regions are erased and corresponding to the memory dump collection.

8. The system of claim 6, wherein the memory controller is configured to receive the indication from reset control logic in response to a system reset event in the computing device.

9. The system of claim 6, wherein a trusted entity associated with the subsystem is configured to initiate storing the information.

10. The system of claim 6, wherein the location information is stored by the subsystem during a system boot.

11. The system of claim 6, wherein the computing device is a portable computing device ("PCD") comprising one of: a cellular telephone, a satellite telephone, a laptop computer, a tablet, a navigation device, a smartbook, a personal digital assistant ("PDA"), an Internet-of-Things ("IoT") device, and an automotive computing device.

12. A non-transitory computer-readable storage medium for protecting memory regions based on occurrence of an event in a computing device, the non-transitory computer-readable storage medium having instructions stored thereon in computer-executable form, the instructions when executed by a processing system configuring the processing system to:
- store, under control of a subsystem of the computing device, location information in registers of memory erase logic of a memory controller identifying one or more memory regions of a memory, the location information in the registers of the memory erase logic comprising addresses for the one or more memory regions which contain sensitive information;
- the memory erase logic of the memory controller receiving an indication from the subsystem, the indication comprising a reset command;
- erase, under control of the memory controller, the one or more memory regions corresponding to the location information comprising addresses for the memory which contain sensitive information in response to the indication received by the memory erase logic of the memory controller; and
- performing a memory dump collection from the memory after erasing the one or more memory regions.

13. The non-transitory computer-readable storage medium of claim 12, wherein the instructions configure the memory controller to receive the indication from reset control logic in response to a system reset event in the computing device.

14. The non-transitory computer-readable storage medium of claim 12, wherein the instructions configuring the processing system to store the location information in the memory erase logic of the memory controller comprise instructions configuring a trusted entity associated with the subsystem to store the location information in the memory erase logic of the memory controller.

15. The non-transitory computer-readable storage medium of claim 12, wherein the instructions configure the processing system to store the location information in the memory erase logic of the memory controller during a system boot.

* * * * *